UNITED STATES PATENT OFFICE.

GEORGE KUNICK, OF LONDON, ENGLAND.

PROCESS OF HOMOGENIZING EMULSIONS.

No. 840,500.   Specification of Letters Patent.   Patented Jan. 8, 1907.

Application filed December 15, 1905. Serial No. 291,841.

*To all whom it may concern:*

Be it known that I, GEORGE KUNICK, a subject of the German Emperor, and a resident of London, England, have invented a certain new and useful Improvement in Processes of Homogenizing Emulsions, of which the following is a specification.

This invention relates to an improved process for rendering more homogeneous liquids or semiliquids composed of various ingredients, and is more especially applicable in obtaining homogenized milk in which the fat particles are completely disintegrated and so thoroughly incorporated in the other constituents that they will not rise to the surface on warming the milk or when the milk is allowed to stand for some time.

Various machines are employed to homogenize or fix milk and other liquids containing fat. According to one process milk is driven through several very narrow channels or passages and on issuing from the same strikes against a stationary or rotating disk or cone, the impact sufficing to break up the fat globules. According to another process the milk is forced under excessive pressure through minute orifices into the interior of a cylinder where the fine jets strike one another and so effect disintegration of the fat particles. Such homogenizing-machines only partially effect the desired object—that is to say, the milk is incompletely homogenized thereby. Moreover, these machines require a pressure of from 2-400 atmospheres, which involves large power and heavy cost. For instance, a machine capable of homogenizing one thousand liters of milk in one hour should be from twelve to fifteen horse-power. Under my invention these disadvantages are avoided by combining the working of one of the machines such as above indicated or of any other homogenizing-machine with the use of any ordinary efficient centrifugal cream-separator.

If a drop of homogenized milk is examined under the microscope and compared with a drop of unhomogenized milk, it is found that the largest fat globules contained in the unhomogenized milk have disappeared and smaller particles have taken their place; but the image does not show the presence only of fat globules of almost equal size and very small diameter, as is sought to be obtained by homogenizing milk. The homogenization has, in fact, been only partial; but if milk so partially homogenized is afterward centrifugalized those fat globules which have already been broken up into very small particles or fragments are no longer separated from the skim-milk by centrifugal action, but flow off with the same, while only the insufficiently-disintegrated fat globules remain with the cream issuing at the cream-outlet. The outflowing milk is then not skim-milk, but contains fat in such a finely-divided condition that it is entirely fixed in the milk and can no longer collect on the surface. Milk so obtained is naturally less rich in fat than the original milk; but, as determined by experiments, it may contain between fifty and seventy-five per cent. of the original fat, the percentage depending on the efficiency of the homogenizing-machine. If the cream which contains the rest of the fat is then again homogenized and centrifugalized either alone or with a fresh quantity of milk and the centrifugalized products are mixed, there is reproduced in the milk the entire original content of fat in the state of exceedingly fine division.

A cheaper embodiment of the invention consists in first separating the milk into skim-milk and cream, treating the cream alone in the homogenizing-machine, and then treating the cream thus incompletely homogenized in the centrifugal machine in the manner described. In this way the cream is separated into two portions, one containing only completely-disintegrated fat globules, which portion flows off through the pipe usually employed for the skim-milk and the other portion containing only insufficiently-disintegrated fat globules, which passes through the pipe generally used for the cream. The part of the cream last mentioned may then alone or mixed with the cream separated from another quantity of milk be again homogenized and centrifugalized, while that part of the cream resulting from the homogenizing and centrifugalizing operation and containing only the completely-disintegrated fat particles is added to the skim-milk. In this manner a completely-homogenized milk can be obtained.

The above process is mainly intended to be used in the production of milk-powder or dried milk and like products possessing considerable durability, it being a very desirable object to obtain such a product which will not turn rancid and will show no separation of the fat particles on the surface when dissolved in water. This problem can only be solved when all the fat globules are distributed in the milk in tiny particles. A great saving in working cost is also hereby effected, because the power required to drive a centrifugal machine is very small. A perfectly-homogenized product can be obtained, although the homogenizing-machine, for example, works only at a pressure of one hundred atmospheres. The necessary power for driving the machine is less than one-half that required in ordinary circumstances, and as a centrifugal machine is used in even the smallest dairies it is possible according to my process to homogenize milk well even in small plants which have not the power required for a high-pressure homogenizing-machine.

The process above described in its application to milk or cream can also be applied with equal success to any liquid or semiliquid containing fat or other substances in suspended form—for example, egg-yolk, egg-yolk preparations, oil or fish-oil emulsions, and the like.

Having now described my invention, what I claim, and desire to secure by Letters Patent of the United States, is—

The improved process of homogenizing emulsions consisting in homogenizing the liquid, removing the larger or non-disintegrated fat globules by centrifugal separation, subjecting the latter again to the homogenizing process, and adding together the homogenized fractions of the original liquid, substantially as described.

In testimony whereof I have signed my name to this specification in the presence of two subscribing witnesses.

GEORGE KUNICK.

Witnesses:
WALLACE FAIRWEATHER,
JNO. ARMSTRONG, Junr.